(12) United States Patent
Fletcher et al.

(10) Patent No.: US 7,327,705 B2
(45) Date of Patent: Feb. 5, 2008

(54) HYBRID WIRELESS NETWORK FOR DATA COLLECTION AND DISTRIBUTION

(75) Inventors: Richard Fletcher, Cambridge, MA (US); David Cavallo, Somerville, MA (US); Alex Pentland, Lexington, MA (US); Amir Hasson, Chicago, IL (US)

(73) Assignee: Massachusetts Institute of Technology, Cambridge, MA (US)

( * ) Notice: Subject to any disclaimer, the term of this patent is extended or adjusted under 35 U.S.C. 154(b) by 957 days.

(21) Appl. No.: 10/190,318

(22) Filed: Jul. 3, 2002

(65) Prior Publication Data

US 2004/0004948 A1  Jan. 8, 2004

(51) Int. Cl.
*H04Q 7/20* (2006.01)
*H04Q 7/38* (2006.01)
*H04L 12/66* (2006.01)

(52) U.S. Cl. ............... 370/331; 370/338; 370/352; 370/401; 455/414.3; 455/436

(58) Field of Classification Search ........... 370/331, 370/338, 352, 401; 455/414.3, 436
See application file for complete search history.

(56) References Cited

U.S. PATENT DOCUMENTS

| | | | |
|---|---|---|---|
| 6,104,712 A | 8/2000 | Robert et al. ............... 370/389 |
| 6,276,542 B1 | 8/2001 | McCrary ..................... 213/75 |
| 6,366,568 B1 | 4/2002 | Bolgiano et al. ........... 370/320 |
| 6,400,722 B1 | 6/2002 | Chuah et al. ............... 370/401 |
| 6,421,714 B1 | 7/2002 | Rai et al. .................... 709/217 |
| 6,732,176 B1 * | 5/2004 | Stewart et al. ............. 709/227 |
| 6,914,695 B2 * | 7/2005 | Walters et al. ............. 358/1.15 |
| 6,965,605 B1 * | 11/2005 | Amos et al. ................ 370/401 |
| 7,035,932 B1 * | 4/2006 | Dowling ..................... 709/230 |
| 7,042,988 B2 * | 5/2006 | Juitt et al. ............... 379/88.17 |
| 7,046,657 B2 * | 5/2006 | Harrington et al. ........ 370/350 |
| 7,058,796 B2 * | 6/2006 | Lynn et al. .................... 713/1 |
| 2003/0037169 A1 * | 2/2003 | Kitchin ....................... 709/249 |
| 2003/0091010 A1 * | 5/2003 | Garahi et al. ............... 370/338 |
| 2003/0208554 A1 * | 11/2003 | Holder ....................... 709/217 |
| 2004/0005878 A1 * | 1/2004 | Olin et al. ............... 455/414.1 |
| 2004/0054774 A1 * | 3/2004 | Barber et al. .............. 709/224 |
| 2004/0078566 A1 * | 4/2004 | Barber et al. .............. 713/161 |
| 2004/0078598 A1 * | 4/2004 | Barber et al. .............. 713/201 |
| 2004/0202120 A1 * | 10/2004 | Hanson ....................... 370/328 |

* cited by examiner

*Primary Examiner*—Alpus H. Hsu
(74) *Attorney, Agent, or Firm*—Norma E Henderson

(57) ABSTRACT

An electronic data transport system includes a mobile access point and a carrier for moving the mobile access point over a surface and/or water route. The mobile access point includes a communications module for wirelessly transmitting data to and receiving data from one or more client devices when the client device is in proximity to the mobile access point.

9 Claims, 4 Drawing Sheets

HYBRID WIRELESS NETWORK FOR DATA COLLECTION AND DISTRIBUTION

BACKGROUND OF THE INVENTION

1. Field of the Invention

The present invention relates to the transport of data, and more particularly to the collection and distribution of data wirelessly and bidirectionally.

2. Description of the Related Art

While advances in communication technologies have enabled convenient, virtually instantaneous connections between individuals throughout the world, the primary beneficiaries have been citizens of developed countries with established telecommunication infrastructures. Outside the developed world, particularly in sparsely populated rural areas or poverty-stricken regions, such infrastructures are rare. Consequently, e-mail, the web and readily available telephone service remain unavailable in such areas. Significant improvements are unlikely in the near term, given the present lack of communications infrastructure, as well as the cost of installing and providing access to modern communications equipment.

One communication technology developed for the transmission of data in areas lacking Internet infrastructure utilizes radio links, such as short-wave, citizens band (CB) radio, and packet radio. A first radio terminal, such as a terminal node controller, typically communicates with a second radio terminal via a base station. Perhaps the most reliable form of rural telecommunications is the use of a two-way radio. These have provided many advantages in rural locations, such as allowing community members to communicate with traveling doctors for medical concerns. Moreover, each terminal (e.g., two-way radio) is typically more robust and has a lower cost than many other communication systems. Nonetheless, base stations for these radio links require large antennas, significant electrical power to run, and are costly to maintain. Further, these systems traditionally communicate at a low data rate, often resulting in difficult or infeasible transmission of large data files.

Another communication technique employed in developing areas is communication via satellite terminals, such as a very small aperture terminal (VSAT) or an Iridium satellite data terminal. Satellite terminals can be deployed anywhere in the world without the need for preexisting infrastructure. Moreover, satellite terminals may provide reasonable data rates (e.g., 10 sec of Mbps for transmissions from the satellite to a ground station and 100 seconds of Kbps for transmissions from the ground station to the satellite). The satellite terminals, however, typically employ costly equipment which require uneconomical service charges. For instance, each ground station can cost $10,000 and may have service charges reaching several thousand dollars per year. Further, conventional satellite terminals require significant electrical power to operate and are not traditionally portable.

A low-cost alternative to the above-mentioned communication techniques that can be applied to developing regions utilizes telephone dial-up connectivity. Although conventional terminals having telephone dial-up capabilities are inexpensive and do not need much power to operate, the installation of telephone lines to developing regions is costly and, particularly in remote rural areas, frequently impractical. Further, since telephone dial-up communication capabilities require large infrastructure, lines may be installed only in certain areas, and even where installed, the lines may not be adequately maintained and often are too noisy to support electronic data transport. Conventional telephone lines typically enable low to medium data transfer rates (e.g., 9600-56000 bps).

Cellular telephone networks are often more realistic for developing, rural areas, since less physical infrastructure is required. Such networks are typically robust, flexible, scalable, and the cost of handsets is relatively low. Further, wireless technology eliminates the installation and maintenance costs of traditional phone lines. With the use of digital data protocols (e.g., time-division multiple access (TDMA) or code-division multiple access (CDMA)), these networks can transmit data in addition to voice. The expense of setting up a cellular infrastructure, however, often hampers the deployment in sparsely populated or poor developing regions. For example, installing a single cell can easily cost $100,000 and one cell typically provides only a few square miles of coverage. The economic status of developing regions frequently does not justify the expense associated with the implementation of a cellular infrastructure.

Instead of cellular network technology, systems such as wide area networks (WANs) and wireless fidelity (WiFi) networks use a packet-switched Internet Protocol (IP) to communicate data wirelessly. These networks support numerous devices, such as a wireless card used in laptops and specialized telephones (e.g., Voice Over IP). For long-range data transport, these systems employ powerful long-distance point-to-point radio towers that beam data from one village to another, or from an Internet connection point, such as an Internet service provider (ISP), to a local village. While such networks are attractive for use in modern cities, the infrastructure and maintenance needed to enable these communications is frequently too costly or impractical to enable widespread deployment in developing areas. Further, as such areas may lack electricity, the placement of the data transceivers are often constrained to particular locations having sufficient power or a sufficient power generator.

In order to reduce costs and reduce power consumption, the data rate of a WAN can be reduced. However, if the distance between towers is large (>10 km), this approach remains difficult to scale to many nodes and is susceptible to interference (e.g., radio frequency (RF) interference) between towers.

DESCRIPTION OF THE INVENTION

Summary of the Invention

The present invention recognizes that conventional communication techniques involve electronic, optical and/or electromagnetic modalities, such as cable or wireless links. These approaches require sophisticated, expensive communications infrastructures interconnecting all senders and recipients. In order to facilitate the transport of information in a low-cost, practical, robust, and scalable fashion while minimizing susceptibility to interference, the present invention utilizes a network combining the efficiency of wireless communications with the availability of existing physical transport modalities. This combined approach provides an economical way to achieve inclusive, wide-scale communications, as large communication towers and other unaffordable equipment are all but eliminated. In addition to cost, the wireless communications of the present invention can occur over a short-range radio link, thereby reducing the vulnerability to interference (e.g., RF interference, weather-induced interference, etc.).

In one aspect, the invention makes use of a mobile access point to wirelessly and bidirectionally communicate with client devices. The mobile access point travels over a surface or water route, communicating with geographically dispersed client devices as it draws into proximity to them. Thus, the location of the client device in relation to the route determines when the client device communicates with the mobile access point.

The mobile access point receives data transmitted by proximate client devices and transmits to the client any previously received data destined for that client. The present invention thereby enables bidirectional, wireless communication in a fashion that is economical and well-suited to regions having limited resources.

In accordance with the present invention, the mobile access point includes a communications module to enable the wireless, bidirectional communication with proximate clients. The mobile access point may additionally make use of a data exchange control module to detect the presence of proximate clients. The data exchange control module may also correct errors in communicated data.

Since the distance of communication between the mobile access point and the client is short relative to other conventional wireless networks, it is possible to maintain relatively high data bandwidth while minimizing power consumption. Given adequate bandwidth, many types of data can be communicated, such as a textual message, an audio signal, a video signal, a signal representing a photograph or image, one or more web pages, etc.

BRIEF DESCRIPTION OF THE DRAWINGS

The invention is pointed out with particularity in the appended claims. The advantages of the invention may be better understood by referring to the following description taken in conjunction with the accompanying drawings in which:

DETAILED DESCRIPTION OF THE INVENTION

Figure 1:
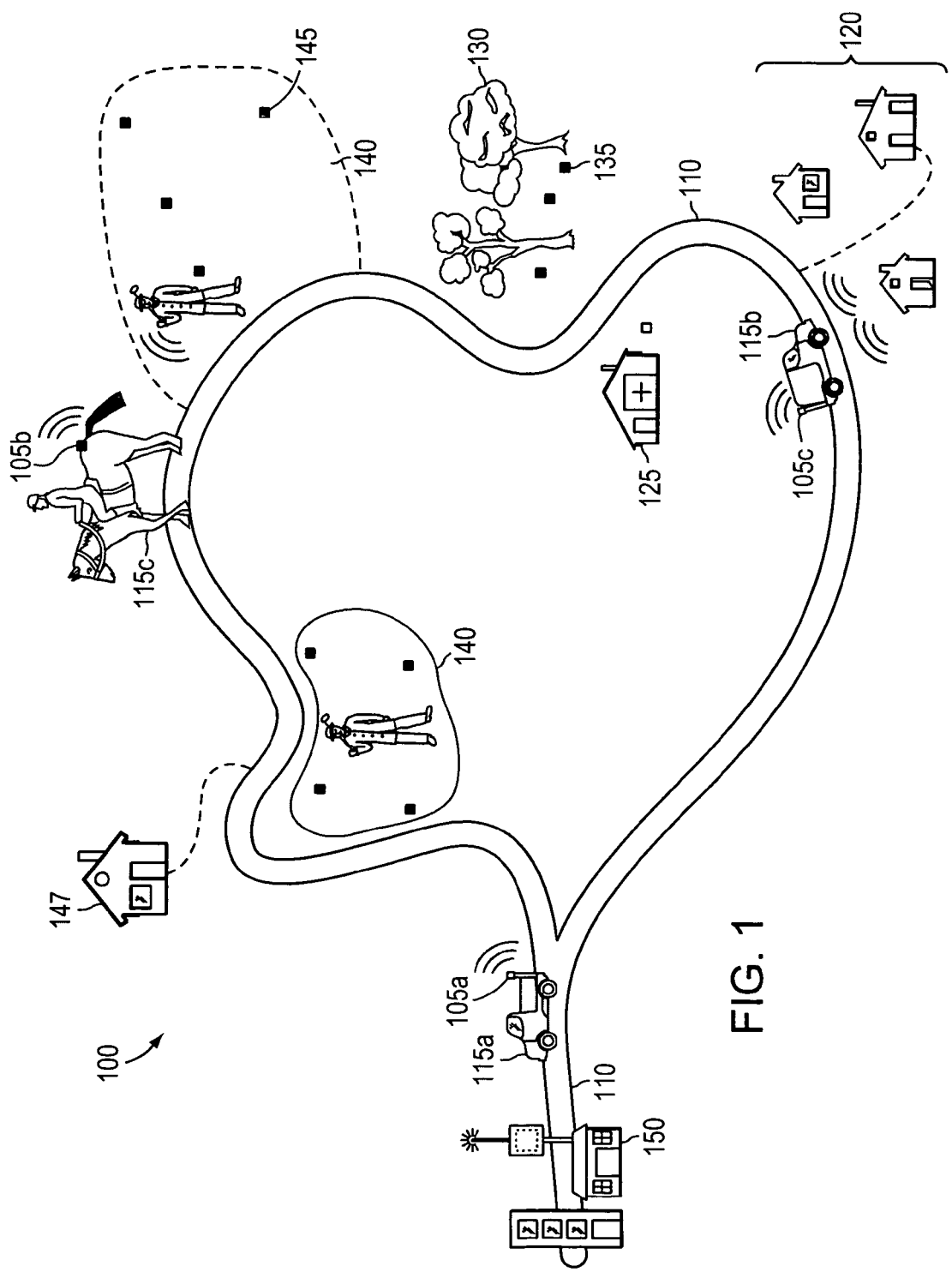
FIG. 1 pictorially illustrates a network in accordance with the principles of the present invention.

With reference to FIG. 1, a network 100 enables one or more mobile access points 105a, 105b, 105c (referred to generally as mobile access point 105) to wirelessly transmit and receive data while the mobile access point 105 physically traverses a surface route 110. The route 110 may be, for instance, a dirt path, a road, water (e.g., in an archipelago), or any combination thereof. Further, the route 110 may be a predetermined path or a more random, undetermined path. Alternatively or in addition, the route 110 may extend over or under water.

Each mobile access point 105 traverses the route 110 via a mobile access point carrier 115a, 115b, 115c (referred to generally as carrier 115). The carrier 115 can carry, drive, ride, haul, bicycle, or boat the mobile access point 115 along the route 110. The carrier 115 can be, for example, a motor vehicle (e.g., a truck 115a, 115b, a car, or a boat), a motorcycle, a bicycle, a train, an air glider, a blimp, an underwater vehicle, or an animal (e.g., a horse 115c, a dolphin, a person, etc.).

As the mobile access point 105 traverses the route 110, the mobile access point 105 wirelessly transmits and/or receives data, such as an email message, to and from one or more proximate client devices (which may themselves be fixed or mobile). As described in more detail below, this wireless, bidirectional communication enables the mobile access point 105 to provide, for example, Internet and/or intranet availability to developing villages, such as village 120.

Moreover, the invention may help medical providers deliver better treatment to patients. For example, the route 10 may pass through or near a medical facility 125 (e.g., a hospital) that does not typically have access to the Internet (and therefore web pages related to health). The mobile access point 105 can communicate with a client device in the medical facility 125, thereby enabling medical providers, such as doctors, to access health-related web pages. In addition, the mobile access point 105 can retrieve data from medical devices used by residents of the village 120, communicating these to the medical facility 125 for analysis.

The invention may also help preserve or monitor the environment. In one embodiment, the route 110 advances through or along a forest preserve 130, enabling the mobile access point 105 to communicate wirelessly with one or more environmental sensor probes (e.g., environmental sensor probe 135). The sensor probes collect data about the forest or environment (e.g., air temperature and humidity). The mobile access point 105 may automatically and wirelessly receive this data and upload it to the Internet for subsequent access by, for example, park officials and geologists.

The route 110 may also advance along or through one or more farming preserves 140, enabling the monitoring of farmland. For example, the mobile access point 105 can communicate with one or more agricultural sensor probes (e.g., probe 145). These sensor probes can collect agricultural data, such as soil composition and crop conditions, and communicate this data to the mobile access point 105. In some embodiments, the mobile access point 105 then transmits this data to one or more farmers and/or uploads it to the Internet. Moreover, the agricultural sensor probes may also be distributed in a greenhouse, sensing and recording data relating to plants, insects, soil, temperature, humidity, and light characteristics of the greenhouse.

This invention can also improve education. If the route 110 passes by a local school 147, school personnel and students alike may transfer data to and from the mobile access point 105 wirelessly. Thus, professors may send and retrieve information over the Internet to integrate into their future lessons.

To communicate data onto a network such as the Internet, a network access point 150 may exist at one or more locations along the route 110. The network access point 150 communicates with the mobile access point 105, enabling it to transmit onto the network, in batch mode, any outgoing data it has received during its traversal of the route 110. The mobile access point 105 can also receive, in batch mode, data from the network which is intended for one or more client devices along the route 110. The mobile access point 105 subsequently communicates the data to the intended client device(s) as it draws into proximity to them during traversal of the route 110. Although the Internet is herein described as the network with which the mobile access point 105 communicates, the mobile access point 105 may alternatively communicate with any other network or networks using the network access point 150. Moreover, the mobile access point 105 can communicate with the network access point 150 every time the mobile access point traverses the route 110 or multiple times during such traversal.

Moreover, although FIG. 1 shows each mobile access point 105 traversing the route 110 via one mobile access point carrier 115, this is solely for ease of illustration, and any number of mobile access points 105 can traverse the route via any number of carriers 115. For instance, a mobile access point 105 may traverse a portion of a route 110 via a first carrier 115 and, to finish the route 110, the mobile access point 105 may be transferred to another carrier 115 for the remainder of the route 110.

Figure 2:
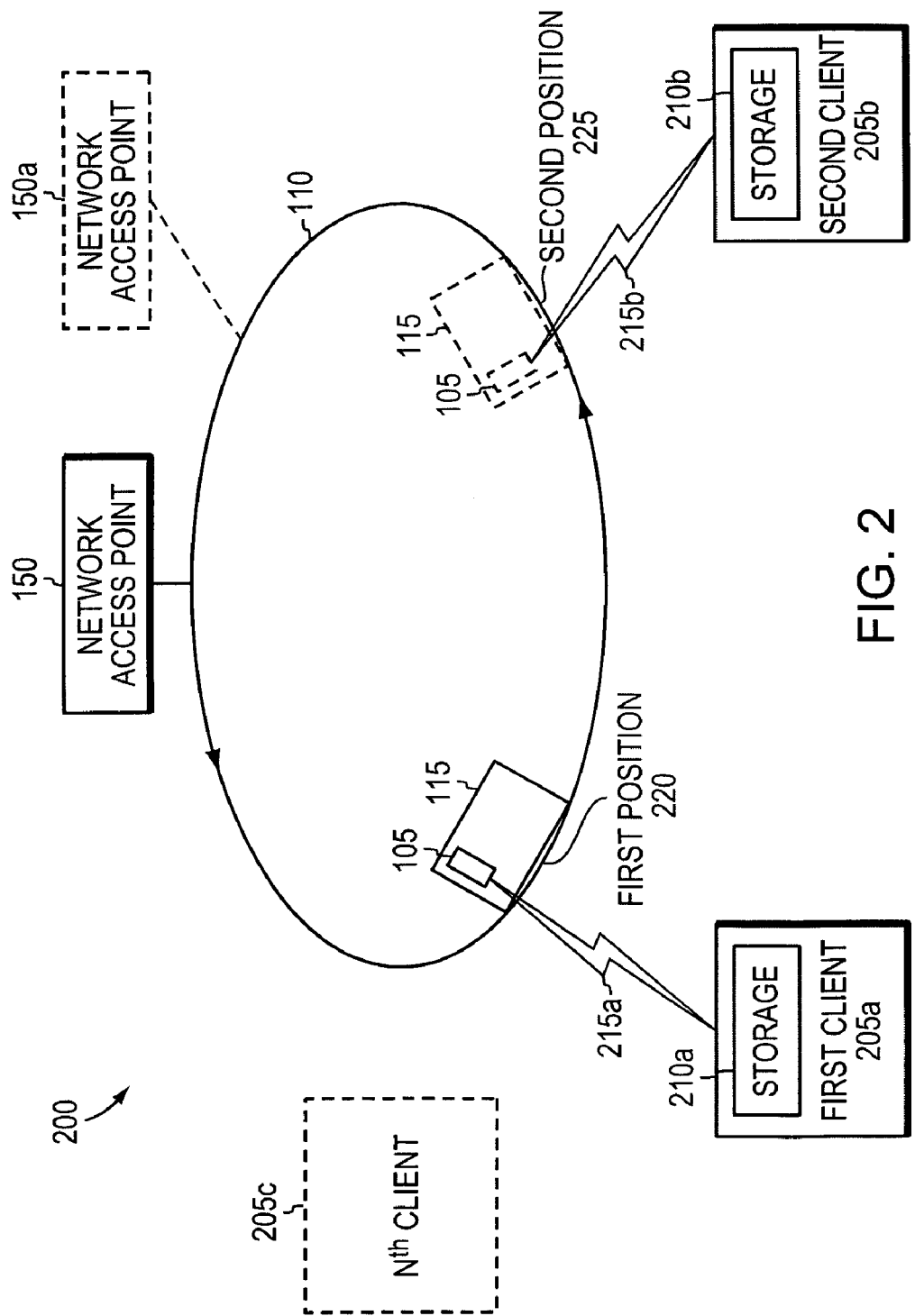
FIG. 2 is a block diagram of an embodiment of a data communications system in accordance with the principles of the present invention.

With reference to FIG. 2, a data transport system 200 includes a mobile access point and a series of geographically dispersed clients. Communications occur first between the mobile access point 105 and a first client device 205a, and subsequently between the mobile access point 105 and a second client device 205b (referred to generally as client 205) in communication with the mobile access point 105. Alternatively, if client devices 205a, 205b are simultaneously within communication range of mobile access point 105 as it approaches, then communication with both client devices can occur simultaneously using a suitable multiplexing scheme.

The client 205 is a device which can wirelessly transmit data to and receive data from the mobile access point 105. The client 205 can be a computer, such as a laptop computer or a personal digital assistant (e.g., PALM devices marketed by Palm, Inc., Santa Clara, Calif., handheld PCs, etc.). Other examples of the client 205 include a sensor probe (e.g., an environmental sensor probe 135 or an agricultural sensor probe 145), as described above, a telephone, or a medical device (e.g., a pacemaker or an insulin pump). Additionally, each client 205 preferably has one or more data storage devices 210a, 210b (referred to generally as data storage 210). The data storage 210 may be, for example, memory, a writeable CD, a hard drive, a cache, or a database.

Like the examples given above for the client 205, the mobile access point 105 can also be a computer or any transceiver capable of communicating with the client 205. In one embodiment, the mobile access point 105 is mounted on the carrier 115, which travels along the route 110 to enable the mobile access point 105 to wirelessly and bidirectionally communicate with one (or more) clients 205 in proximity thereto. For example, as illustrated, the communication with the first client 205a may occur over a first wireless communications link 215a and the communication with the second client 205b over a second wireless communications link 215b (generally referred to below as a communications link 215). The communications link 215 may be, for instance, a short-range radio link.

In one embodiment, communication between the mobile access point 105 and the client 205 occurs automatically when the client 205 is near the mobile access point 105. For example, as the carrier 115 reaches a first position 220 along the route 110, the first client 205a is located near the mobile access point 105 and, consequently, communication with the mobile access point 105 occurs automatically. The first position 220 can be any distance away from the route 110 as long as the client 205 and the mobile access point 105 can wirelessly communicate; the position 135 ordinarily is not limited to a particular direction.

During the communication session between the mobile access point 105 and a particular client 205, data is exchanged. In particular, data intended for the client 205, such as incoming e-mail and other messages, as well as web pages or other Internet resources previously requested by the client 205, have been stored on the mobile access point 105 (since being obtained, for example, through interaction with the network access point 150 and other clients 205); these items are now transmitted to the client 205. In addition, the mobile access point 105 obtains outgoing data (e.g., e-mail, requests for Internet resources, etc.) from the client 205 and stores these locally for later action.

Once communications end between the mobile access point 105 and the client 205, the carrier 115 continues its traversal of the route 110. Alternatively, the carrier 115 can continue to move during the transfer of data as long as data transmissions between the mobile access point 105 and the client 205 finish correctly (e.g., are not cut off). The carrier 115 may test the data rate of the transfer between the client 205 and the mobile access point 105 over the communications link 215.

When the mobile access point carrier 115 (now shown with dashed lines) comes to a second position 225, the mobile access point 105 (also shown with dashed lines) communicates with the second client 205b over the second communications link 215b. The second communications link 215b can have the same (or different) characteristics as the first communications link 215a.

As the communications over the links 215 between the mobile access point 105 and the clients 205 are accomplished using, for example, a short-range radio link, the dependence on large amplifiers and towers (e.g., satellite ground stations) is consequently eliminated or reduced. This, in turn, reduces the power consumption of the hardware needed to operate the data transport system 200 relative to other data communications networks. Furthermore, the data transport system 200 reduces the RF interference (and other forms, such as interference from weather) experienced during the data transfer, as the system 200 communicates over a short distance. Yet another advantage of the data transport system 200 is the costs associated with the implementation and maintenance of the system 200. The components (e.g., the mobile access point 105 and the clients 205) are typically inexpensive to procure and operate.

Although the data transport system 200 is shown as having two clients 205 and one mobile access point 105, this is solely for ease of illustration, and any number of clients 205 (e.g., shadow $N^{th}$ client 205) and any number of mobile access points 110 may be included in the invention. Further, the mobile access point carrier 115 may travel along one or multiple routes. Moreover, each carrier 115 may travel around different routes, may travel the same routes at different times, or may vary the traveled route from one data transfer session to the next.

Exemplary applications of the data transport system 200 include providing Internet and intranet access to rural villages. Suppose a first person (also referred to below as the sending person) living in the developing, rural village 120 wants to send an email message (or other data) to a second person (also referred to below as the receiving person) living in another village. Each person has access to a client 205, such as a local data terminal. The sending person creates an email message on the first client 205a, which is communicated to the mobile access point 105 when it draws into proximity. The mobile access point 105 then continues along the route and determines which client 205 is the recipient of the email message. When the mobile access point 105 reaches that particular client 205, it can transmit the email message to the correct recipient.

Figure 3:
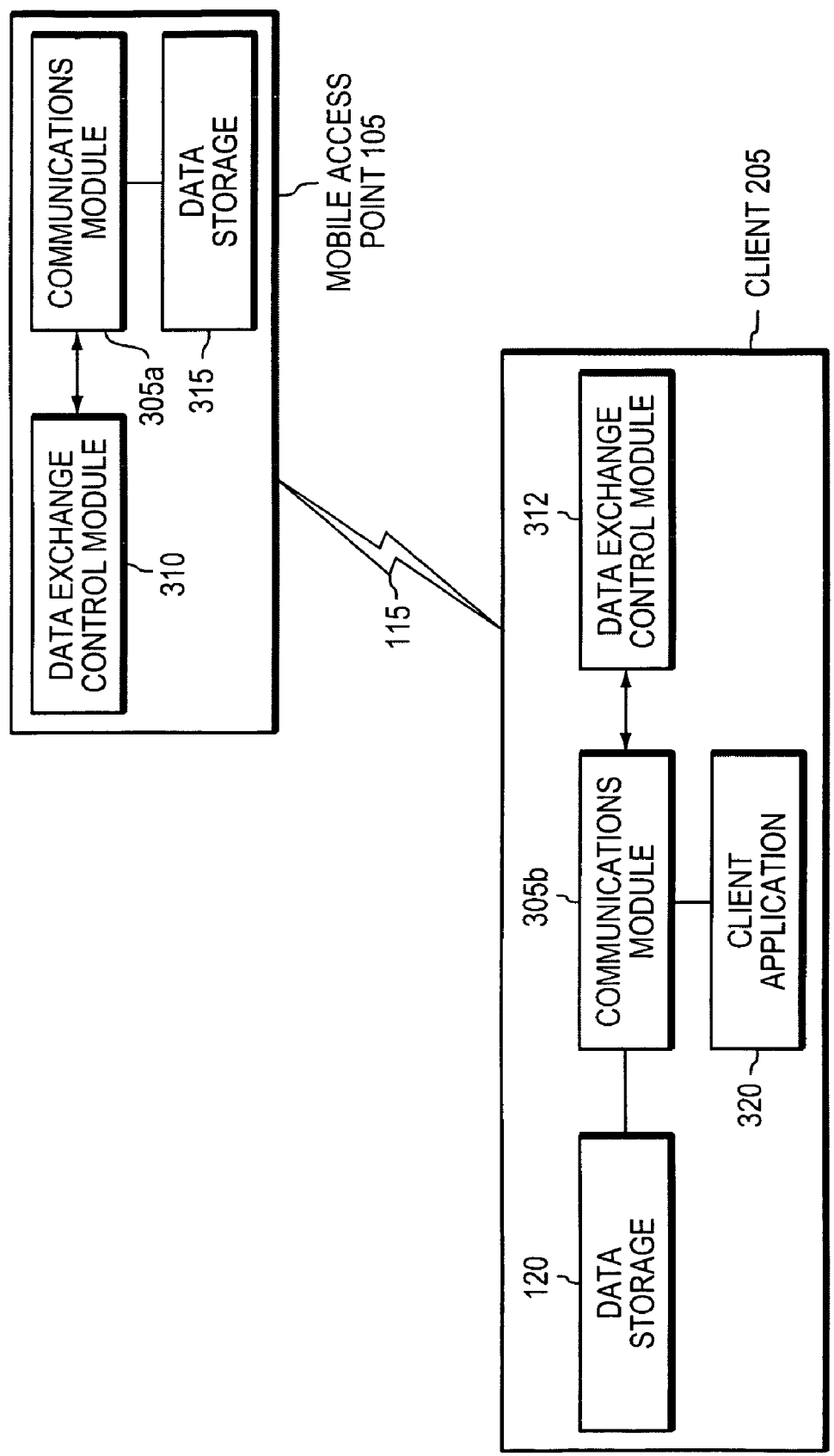
FIG. 3 is a block diagram of an embodiment of a client and a mobile access point in accordance with the principles of the present invention.

With reference to FIG. 3, the client 205 and the mobile access point 105 include hardware components and software modules to enable the communications described above. Although much of the description below focuses on the mobile access point 105, the description also applies to the client 205 because many of the components and modules are similar to those in the mobile access point 105. To enable the communications described above, in one embodiment the mobile access point 105 and the client 205 each include a respective communications module 305*a*, 305*b* (generally referred to as a communications module 305).

The communications module 305 enables the mobile access point 105 to accept outgoing data from proximate clients 205 and to transmit to the client 205 any previously received data intended for the client 205. Thus, the communications module 305 coordinates the communications with the clients 205. On the client side, the communications module 305*b* can include, for example, a local mail server and a web server to interface with a wide variety of client application software. To ease integration with client software, the communications module 305 can support a number of standard communication protocols for sending and receiving data, such as Post Office Protocol 3 (POP3), Simple Mail Transfer Protocol (SMTP), and Hypertext Transfer Protocol (HTTP).

For interfacing with the network side, the communications module 305*b* can implement a custom protocol or a standardized protocol such as UUCP (Unix-to-Unix Copy Program) that is specifically designed to support store-and-forward connections employing single or multiple hops (data transfers) in a distributed network.

The communications module 305 communicates with the client 205 over the communications link 215 via a wireless interface (e.g., IEEE 802.11 or Bluetooth). The mobile access point 105 preferably also includes a data exchange control module 310 to detect the presence of any nearby clients 205 and coordinate data transfer. The detection of the client 205 enables the mobile access point 105 to automatically transmit and receive data from the client 205 when the mobile access point 105 is within a particular distance (e.g., at the first position 220) of the client 205. In one embodiment, the mobile access point 105 and/or client 205 periodically transmits a beacon or location-identifying signal. The data exchange control module 310 detects the client 205 or mobile access point 105 when the module 310 receives the signal and initiates data transfer.

The data exchange control module 310 may also detect errors and perform error correction techniques to alleviate inaccurate data communications. For instance, the data exchange control module 310 may accomplish error correction through the attachment of a checksum to each segment (e.g., frame) of data transmitted to the client 205. If the data exchange control module 310 attaches a checksum to the transmitted data, the client 205 can then verify whether the checksum matches the transmitted data. Likewise, the client 205 can add a checksum to data that it transmits to the mobile access point 105. Consequently, the mobile access point 105 verifies the received checksum with the received data.

Alternatively, the data exchange control module 310 can employ a cyclic redundancy check (CRC) to detect data transmission errors. The client 205 and the mobile access point 105 (e.g., data exchange control module 310) may also employ error correction protocols during data communication, such as V.42. Similarly, the client 205 can also include a client data exchange control module 312 for the purposes described for the mobile access point's data exchange control module 310.

Additionally and as described above for the client 205, the mobile access point 105 may include one or more data storage devices 315. The mobile access point 105 can utilize the data storage 315 to store data that it receives from one or more clients 205.

For instance, suppose a first requesting client 205 communicates to the mobile access point 105 a request for a particular web page along with data for posting on the Internet. The mobile access point 105 stores the request and the data until reaching the network access point 150. If the mobile access point 105 receives additional data for transmission to the Internet, such as from another (second requesting) client 205 along the route 110, the mobile access point 105 also queues this data in its storage 315. Once the mobile access point 105 reaches the network access point 150, the mobile access point 105 transmits all of its stored data intended for the Internet, in batch mode, to the network access point 150 for subsequent Internet posting or use. Thus, the mobile access point 105 transmits the data intended for the Internet by the first requesting client 205 and the second requesting client 205.

Moreover, the mobile access point 105 retrieves any and all data, in batch mode, from the Internet that the clients 205 requested, such as the particular web page requested by the first requesting client 205. In some embodiments, because the communication of data occurs intermittently (e.g., mobile access point 105 traverses route 110 once a day), the mobile access point 105 retrieves the requested web page along with additional web pages, such as pages multiple levels down from the requested web page or links from the requested web page. Thus, when the mobile access point 105 traverses the route 110 and then communicates with the client 205, the mobile access point 105 transmits all of the data intended for this client 205 (e.g., the requested web page and all associated web pages) to the client 205.

To perform functions on and interact with the data, the client 205 executes one or more client applications 320, each of which is an active process running on the client 205. Examples of functions that the application 320 perform include creating, enabling access to, displaying, reading, writing, manipulating, moving, storing, transmitting, and receiving the data. In one embodiment, a client application 320 is an Internet browser (e.g., Internet Explorer developed by Microsoft Corporation, Redmond, Wash.). Alternatively, the application 320 can be any program or software module, such as word processing software, email or database software.

Indeed, an advantage of the invention includes the ability to implement the data communications in a client device 205 while not forcing the rewriting of software presently loaded on or executing on the client 205. Specifically, no change in or update of the client application 320 has to occur, as the communications module 305 can communicate and interact with the current client applications 320. Thus, the communications module 305 can act as an addition to, rather than as a replacement of, any software module.

Further, although the modules are illustrated as internal modules of the client 205 and the mobile access point 105, any number of the modules may be external to the client 205 and/or the mobile access point 105.

Figure 4:
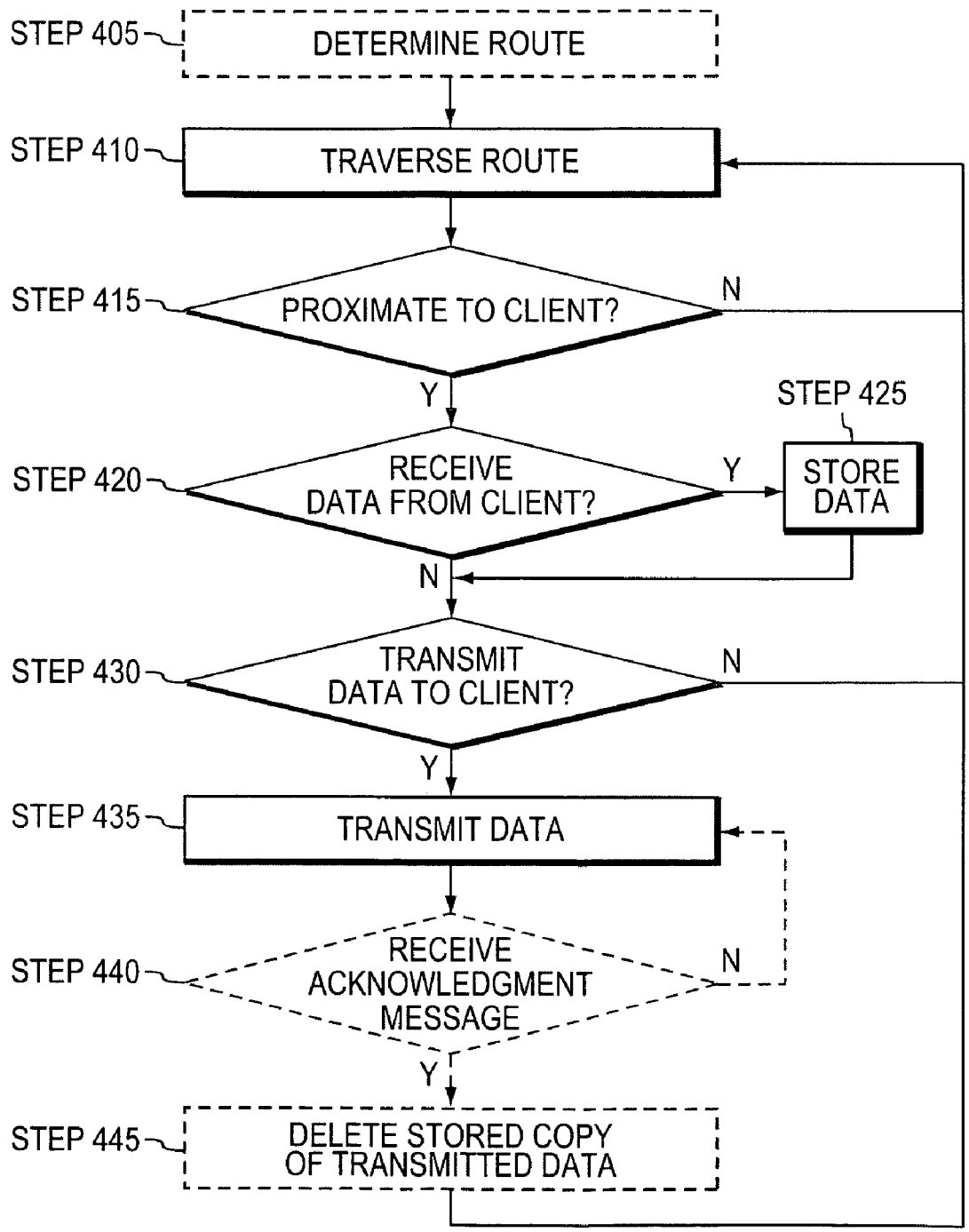
FIG. 4 is a flow diagram depicting an illustrative operation of the steps performed by a mobile access point to communicate with a client.

FIG. 4 illustrates an embodiment of the steps performed by the data transport system 200. The mobile access point 105 may first determine a route 110 to follow in order to communicate with the clients (step 405). This determination can be made, for example, in response to weather conditions, traffic, the nature of the thoroughfares that the mobile access point 105 will travel, and the conditions of various route segments. In one embodiment, the mobile access point 105 automatically retrieves a route 110 to follow from its data storage device 315. The route 110 may be selected as the fastest route (e.g., in terms of time), the shortest route (e.g., in terms of distance), or the least congested route at a particular time.

The route 110 may also change or be changed while the mobile access point 105 is moved along the route, such as if the mobile access point 105 receives particular instructions from a client 205 to deliver the data to the network access point 150 immediately (e.g., due to an emergency). Once the mobile access point 105 determines the route 110 to follow, the mobile access point 105 may convey this information to the carrier 115.

The mobile access point 105 then traverses the route 110 via the carrier 115 (step 410). During the movement along the route 110, the mobile access point 105 determines if a client 205 is in sufficiently close proximity to support wireless communication (step 415). As described above, the mobile access point 105 may determine this based on, for example, its coordinates along the route 110 or a sensor sensing when the client 205 is within a particular distance of the route 110. Alternatively, the mobile access point 105 transmits an identification message (e.g., continuously or periodically) to the client 205 to denote its location and whether the mobile access point 105 is close enough to the client 205 for data communication to begin. When communication is established, the client 205 begins its transmission.

The mobile access point 105 then determines if the client 104 (step 420) has data to transmit. The mobile access point 105 can make this determination when establishing a common link with the client 205, or in response an explicit message from the client 205. Further, the data that the mobile access point 105 receives typically contains a source and a recipient designator denoting its intended destination. The mobile access point 105 may store the data in its data storage device 315 (step 425) for future use or delivery.

The mobile access point 105 then determines whether to transmit data to the client 205 step 430). In one embodiment, each client 205 and each mobile access point 105 has a unique IP address. Thus, the mobile access point 105 can search its data storage device 315 for data whose intended recipient has the client's IP address. Once the mobile access point 105 determines that it has data to transmit to the client 205 in proximity of the mobile access point 105, the mobile access point 105 transmits the data to the intended client 205 (step 435).

To ensure that the second client 205*b* receives the data, the mobile access point 105 may wait to receive an acknowledgment message before continuing along the route 110 (step 440). If an acknowledgment message is not received after a predetermined time, the mobile access point 105 can again transmit the data to the client 205 in step 435. Once the mobile access point 105 receives an acknowledgment message from the client 205, the mobile access point 105 deletes its stored copy of the data transmitted to the client 205 (step 445). Upon the delivery of the data to its intended recipient, the mobile access point 105 continues along the route 110 (step 410) and repeats the process when coming within a particular distance of another client 205. Likewise, if the mobile access point 105 determined that it had no data intended for the proximate client 205 in step 425, the mobile access point 105 then proceeds with step 410.

In addition to the embodiments described above, the data transport system 200 can also be utilized in a warehouse. For instance, the carrier 115 of the mobile access point 105 can be a cart and the route 110 can be a track. Client devices 205 can serve inventory-control functions and be scattered throughout the manufacturing plant or warehouse, such as at the ends of every row of materials. As the cart 115 moves along the track 110, the mobile access point 105 receives data from the client 205, such as inventory information (e.g., quantity, price, and weight of item). If a price of a particular item was increased, the mobile access point 105 can receive this information from the network access point 150 (e.g., the Internet) and, subsequently, transmit the price information to each intended client 205 for updating of the price.

A manufacturing plant can also benefit from the data transport system 200. For example, a robot working on an assembly line can be a client 205. If a supervising worker (human or robotic) moves a mobile access point 105 around the manufacturing plant, the mobile access point 105 can receive, for example, status information on each robot 205, performance information such as the number of products that each robot 205 has produced, and faults or problems with any of the machinery. Moreover, the mobile access point 105 may transmit instructional information to particular robots 205, such as instructions to switch programs or switch jobs. Thus, the mobile access point 105 can alter the operation of each robot 205 in the manufacturing plant to maximize productivity. Further, the route 110 may include a conveyor belt, thereby causing the mobile access point 105 to communicate with clients 205 as it travels along the assembly line.

This invention may also be extended to a smart house, where one or more household items communicate with a mobile access point 105 that is, for instance, worn by the homeowner. For example, the mobile access point 105 may be the homeowner's cellular phone. When the homeowner walks from one room to another, the "smart" item(s) in the house, such as an answering machine, communicate information with the cellular phone 105. This information may include the number of phone messages that the owner has not yet heard, thereby preventing the homeowner from missing an important message for a long period of time. The data may be communicated via a text message displayed on the cellular phone 105 or one or more audio tones, such as a unique phone ring. Even further, the answering machine may communicate the phone message(s) to the cellular phone, enabling the cellular phone to play the answering machine messages to the homeowner without having to physically check or call the answering machine.

The invention may also be used in support of military operations in remote rural regions lacking a communications infrastructure. The use of short-range radio links as described herein enables the use of small low-power and portable communications devices that are not only mobile but also resistant to electronic countermeasures by the enemy, such as surveillance or jamming.

Although the present invention has been described with reference to specific details, it is not intended that such details should be regarded as limitations upon the scope of the invention, except as and to the extent that they are included in the accompanying claims.

What is claimed is:

1. A method of transporting data, the method comprising the steps of:
   (a) causing a mobile access point to physically traverse a route along which a plurality of client devices are located, the client devices having at most local area connection access;
   (b) as the mobile access point enters into proximity to a first client device, causing the mobile access point to bidirectionally communicate with the proximate first client device, accepting outgoing data from the proximate client device and transmitting to the proximate client device any previously received data intended therefore; and (c) storing, at the mobile access point, data received from the proximate first client device for subsequent transmission to a network access point or directly to a second client device when the mobile access point enters into proximity to the network access point or the second client device.

2. The method of claim 1, wherein at least one client device is mobile.

3. The method of claim 1, wherein the step of physically traversing comprises at least one of carrying, driving, riding, hauling, bicycling, boating, floating and air gliding the mobile access point along the route.

4. The method of claim 1, further comprising the step of transmitting, in batch mode, at least some of the outgoing data onto a network, and receiving, in batch mode, data from the network intended for at least some of the client devices.

5. The method of claim 4, wherein the network comprises the Internet.

6. The method of claim 5, wherein at least some of the outgoing data is a request for a web page and further comprising the steps of:

retrieving the requested web page and at least some additional web pages linked to the requested web page; and storing the requested web page and additional web pages for transmission to the requesting client device when the mobile access point is proximate to the requesting device.

7. The method of claim 1, wherein the mobile access point wirelessly communicates with the client devices as it traverses the route.

8. The method of claim 1, wherein the step of receiving the data comprises correcting errors in the data.

9. The method of claim 1, further comprising the step of transmitting at least some of the outgoing data to the second client device.

* * * * *